United States Patent [19]

McIntyre

[11] Patent Number: 4,873,140

[45] Date of Patent: Oct. 10, 1989

[54] ARTICLES HAVING LOW ADHESION ARTICLES HAVING COATINGS THEREON

[75] Inventor: Daniel K. McIntyre, St. Paul, Minn.

[73] Assignee: Minnesota Mining and Manufacturing Company, Saint Paul, Minn.

[21] Appl. No.: 186,955

[22] Filed: Apr. 27, 1988

[51] Int. Cl.$^4$ ............................ C09J 7/02; B32B 27/08
[52] U.S. Cl. .................................... 428/343; 428/352; 428/353; 428/422; 428/914
[58] Field of Search ................ 428/421, 422, 40, 332, 428/213, 343, 914, 352; 560/170, 115, 246, 247; 260/544 F; 427/53.1

[56] References Cited

U.S. PATENT DOCUMENTS

| | | | |
|---|---|---|---|
| RE. 24,906 | 12/1960 | Ulrich | 526/931 |
| 3,536,749 | 10/1970 | Groves | 560/170 X |
| 3,544,537 | 12/1970 | Brace | 526/246 |
| 3,553,179 | 1/1971 | Bartlett | 526/246 |
| 3,766,251 | 10/1973 | Caporiccio | 526/247 |
| 4,321,404 | 3/1982 | Williams et al. | 560/115 |
| 4,323,591 | 4/1982 | Wendling et al. | 427/53.1 |
| 4,404,247 | 9/1983 | Dominguez-Burguette et al. | 428/213 |
| 4,472,480 | 9/1984 | Olson | 428/332 |
| 4,567,073 | 1/1986 | Larson et al. | 428/40 |
| 4,647,413 | 3/1987 | Savu | 260/544 F |
| 4,681,925 | 7/1987 | Strepparola et al. | 526/246 |

*Primary Examiner*—Thomas J. Herbert
*Attorney, Agent, or Firm*—D. M. Sell; W. N. Kirn; C. Truesdale

[57] ABSTRACT

A coated article with a substrate having a low surface energy coating thereon, said coating comprising an in situ polymerized monofunctional poly(perfluoropropyleneoxy) acrylate or methacrylate oligomer. The oligomer has a poly(perfluoropropyleneoxy) segment, $[CF(CF_3)CF_2O]_d$, which has a number average molecular weight of about 800 to 25,000.

16 Claims, No Drawings

ARTICLES HAVING LOW ADHESION ARTICLES HAVING COATINGS THEREON

FIELD OF THE INVENTION

This invention relates to articles, such as pressure-sensitive adhesive tapes, having a substrate with a coating layer, or liner, of a low adhesion perfluoropolyether composition and to a process for preparing such coated, or lined, articles.

Pressure-sensitive tapes are widely used articles of manufacture. One type of pressure-sensitive adhesive tape is that which is wound directly upon itself in roll form. Such tape has a substrate which has a pressure-sensitive adhesive on one face and generally has a low adhesion backsize, or release, coating on the other face to facilitate unwinding of the tape without delamination of the adhesive. Another type of pressure-sensitive adhesive tape is a composite-type tape. This composite-type tape has a base, such as film, paper, or the like which has a pressure-sensitive adhesive on one face and a disposable protective web having a substrate with a low-adhesion release layer on one face, the low-adhesion release layer contacting and protecting the pressure-sensitive adhesive. Any such low-adhesion coating must both adhere strongly to its underlying substrate and be sufficiently cohesive so as to not contaminate the adhesive, i.e., not to interfere unduly with its adhesiveness.

Pressure-sensitive adhesive transfer tapes which are used in adhering two similar or dissimilar surfaces together also require release coatings. Such tapes generally have a pressure-sensitive adhesive layer releasably adhered to a supporting substrate, the substrate having a release coating thereon to promote release of the substrate from the adhesive after the adhesive has been brought into contact with a surface to be adhered. When transfer tape is provided in roll form, i.e., wound directly upon itself, the back surface of the substrate, i.e., the surface other than that to which the adhesive is releasably adhered, must have a very low adhesion release coating thereon to facilitate unrolling of the tape with the adhesive remaining releasably adhered to and supported by the unrolled substrate.

Pressure-sensitive adhesive tapes having porous backings such as breathable medical tapes have a particular need for highly effective low adhesion backsize coatings when wound upon themselves into roll form. Unless the low-adhesion backsize coating is sufficiently effective, the pressure-sensitive adhesive may gradually migrate into the bottom pores of the backing creating a mechanical bond such that the adhesive layer splits upon unwinding. For some such tapes, use of a nonporous, disposable, low-adhesion web is required where sufficiently effective low-adhesion backsize coatings are not available.

Certain pressure-sensitive adhesives such as poly(dimethylsiloxane) are extremely aggressively tacky. Pressure-sensitive adhesive tapes utilizing such adhesives also have a need for highly effective low-adhesion backsize coatings, especially after prolonged storage. Unless the low adhesion backsize coating is sufficiently effective, such adhesives can carry away such coating material, and thus be contaminated by appreciable amounts of the low-adhesion material.

Certain pressure-sensitive adhesive transfer tapes, such as those provided in roll form with a substrate supporting a silicone pressure-sensitive adhesive layer require low adhesion coatings on each surface of the supporting substrate and such coatings should also not contaminate the adhesive.

Various substrates require low-adhesion backsize coatings for a variety of purposes, e.g., nonstick coatings for cookware, ice-releasing coatings for aircraft, and lubricative coatings for magnetic recording media. Such low-adhesion coatings are sometimes called "release coatings", a term which also encompasses release agents for molds, which may be effective only by failing cohesively. Lubricants usually function as release coatings by cohesive failure. To distinguish release coatings which are designed to fail cohesively from those which are designed to fail adhesively and to resist cohesive failure, the latter are sometimes called "liners" and more specifically, "low energy liners" because low surface energy is important to their effectiveness.

U.S. Pat. No. 3,536,749 (Groves) discloses fluorocarbon-acrylate products which are useful as low-adhesion backsize coatings for many pressure-sensitive adhesive tapes. These fluorocarbon-acrylate products are adducts of fluorocarbon amides having at least one hydrogen atom bonded to the amide nitrogen atom and an ester of acrylic acid and are in the form of monomeric solids when used as low-adhesion backsize coatings.

A perfluoropolyether low surface energy liner useful as a low-adhesion backsize coating for pressure-sensitive adhesive tape is disclosed in U.S. Pat. No. 4,472,480 (Olson). The liner comprises an insoluble polymer of polymerized, film-forming monomer having a polymerizable functionality greater than one, preferably within the range of 1.5 to 2.0 in order to provide covalent bonding at both ends of most of the segments, and a perfluoropolyether segment which is a plurality of perfluoroalkylene oxide repeating units.

A composite low surface energy liner of pefluoropolyether is disclosed in U.S. Pat. No. 4,567,073 (Larson et al.). This composite liner has an inner layer of insoluble polymer made from polymerizable film-forming monomer having a polymerization functionality greater than one and an outer layer of insoluble polymer made from a polymerizable film-forming monomer copolymerizable with the monomer of the inner layer and having a perfluoropolyether segment which is a plurality of perfluoroalkylene oxide repeating units and which preferably has a functionality within the range of 1.5 to 2.0 in order to provide covalent bonding at both ends of most of the segments.

Perfluoropolyether polymers are known to function effectively for the lubrication of plastics and metallized magnetic recording media. For example, U.S. Pat. No. 4,404,247 (Dominquez-Burguette et al.) discloses magnetic recording media protected by an ultra-thin, composite low surface energy covering provided by an inner layer of insoluble polymer and an outer layer of insoluble polymer which are made by in situ polymerization. The inner layer is made from two monomers, a film-forming aromatic or heterocyclic polymerizable monomer having a plurality of ethylenically unsaturated polymerizable groups and a vinyl aromatic comonomer, and the outer layer is made from polymerizable perfluoropolyether monomer having ethylenically unsaturated polymerizable groups.

U.S. Pat. No. 4,321,404 (Williams et al.) discloses radiation curable compositions for abherent coatings which comprise a polyfluorinated acrylate compound, a polyethylenically unsaturated crosslinking agent and a film-forming organic polymer. Among the preferred polyfluorinated acrylate compounds are poly(fluorooxyalkylene)urethane acrylates and methacrylates which contain perfluoropolyether segments in the backbone.

U.S. Pat. No. 4,647,413 (Savu) discloses perfluoropolyether oligomers and polymers which can be prepared by the condensation or addition reaction of a perfluoroaliphatic diacylfluoride with hexafluoropropylene epoxide to produce an acid fluoride-terminated adduct or oligomer product which is then subjected to ultraviolet light-induced cleavage/coupling reaction or photopolymerization to yield an acid fluoride-terminated coupled or block polymer. This photopolymer product can be further reacted to yield derivatives.

U.S. Pat. No. 4,681,925 (Strepparola et al.) discloses fluorinated polymers prepared from acrylic esters and/or acrylamides, in which the cross-linking degree of the final product is controlled by using, as a starting product, a mixture of mono- and di-acryl monomers, the monomers being characterized in that they include in their structure a perfluoropolyoxyalkylene chain. These polymers are described as being elastomeric and very flexible at low temperatures and possessing excellent resistance to thermal degradation, excellent oil- and water-repellent properties, high resistance to the action of mineral oils and vegetable oils, high resistance to oxidizing agents and excellent surface physical properties which result in extremely low values of the critical surface tension and of the wettability of films prepared therefrom, and are particularly suitable for imparting a high resistance to soiling and to water absorption to fabrics.

Various monomers having perfluoropolyether segments in the backbone and acrylate terminal portions are recognized for their ability to provide fabrics with oil and water repellency. For example, U.S. Pat. No. 3,544,537 (Brace) discloses poly(perfluoroalkoxy)polyfluoroalkyl acrylate-type esters and their polymers, the polymers having utility as oil and water repellents for textiles. The esters are represented by the formula $$R_fO[CF(CF_3)CF_2O]_nCF(CF_3)CH_2O_2CCR=CH_2$$

wherein $R_f$ is perfluoroalkyl, R is hydrogen or methyl and n is an integer of 0 to 2. Brace discloses that although esters can be prepared in which the value of n exceeds two, the polymers of such esters do not have the utility as oil and water repellents.

U.S. Pat. No. 3,553,179 (Bartlett) discloses acrylate-type esters of perfluoropolyoxa-alkaneamidealkyl alcohols and their polymers. The ester monomers can be represented by the formula $$R_fO[CF(CF_3)CF_2O]_nCF(CF_3)C(O)N(R'-)RO_2CC(R'')=CH_2$$

wherein $R_f$ is perfluoroalkyl, n is 0-8, R' is hydrogen or lower alkyl, R is alkylene, and R'' is hydrogen or methyl. Homopolymers of these monomers and copolymers of these monomers with vinylidene monomers are described as being useful as oil and water repellents and as metal corrosion inhibitors.

U.S. Pat. No. 3,766,251 (Caporiccio et al.) discloses polymerizable polyfluorinated polyether acrylates, methacrylates, acrylamides, and methacrylamides and their polymers. The monomers can be represented by the formula $$A-O(C_3F_6O)_m(CF_2O)_n-CF_2-Z-CO-CR=CH_2$$

wherein $C_3F_6$ represents a group obtained by the opening of the double bond of a hexafluoropropylene molecule, $-C_3F_6-$ and $-CF_2O-$ are repeating oxyperfluoroalkylene units which, when simultaneously present, are distributed randomly along the chain, m and n may be zero or integers from 1 to 20 with the proviso that n and m cannot both be zero at the same time, the sum of m+n is an integer from 1 to 20, A is a $CF_3-$ or $CF_3-O-CF(CF_3)-$ terminal group, Z is $-CX(Y)O-$ or $-CH_2NR'-$ wherein X is a hydrogen or fluorine atom, Y is a $CF_3$ group or may be hydrogen but only when X is also hydrogen, and R and R' are the same or different and are hydrogen or $CH_3$. The polymers prepared from these monomers comprise a main carbon chain having polyperfluoropolyether side groups and are useful for rendering fabrics oil, water, and soil resistant.

None of these monomers or polymers disclosed by Brace, Bartlett, or Caporiccio have been described as having utility as low surface energy liners or coatings.

SUMMARY OF THE INVENTION

The present invention provides a substrate having a low surface energy coating, the coating being an in situ-polymerized monofunctional poly(perfluoropropyleneoxy) acrylate or methacrylate oligomer said oligomer having a poly(perfluoropropyleneoxy) segment, $[CF(CF_3)CF_2O]_d$, having a number average molecular weight of about 800 to 25,000. The poly(perfluoropropyleneoxy) oligomer can be represented by the formula $$R_fO[CF(CF_3)CF_2O]_dCF(CF_3)CH_2OC-\underset{R}{\overset{O}{\underset{|}{C}}}=CH_2$$

wherein $R_f$ is a straight, branched, a cyclic perfluoroalky group having 1 to 6 carbon atoms, d is a number having an average value of from about 5 to 150, preferably 7 to 60 and R is hydrogen or a methyl group. When d is a number having an average value of from about 5 to 150, the poly(perfluoroalkyleneoxy) segment, $[CF(CF_3)CF_2O]_d$ has a number average molecular weight of about 800 to 25,000. Preferably, d has a value of about 7 to 60 and the poly(perfluoroalkyleneoxy) segment has a number average molecular weight of about 1200 to 10,000.

This in situ-polymerized poly(perfluoropropyleneoxy) oligomeric coating is useful for preventing such materials as tar, asphalt, raw rubber, cooking fats, and the like from adhering to substrates, particularly flat surfaces or films, such as steel, glass, paper, aluminum, and polymeric materials. The coating is particularly useful when utilized in pressure-sensitive adhesive tapes as a release liner, especially when the pressure-sensitive adhesive tape utilizes a silicone as the adhesive and polyethylene terephthalate film as the substrate.

DETAILED DESCRIPTION OF THE INVENTION

The poly(perfluoropropyleneoxy) oligomers useful for preparing the coatings of the present invention can be obtained from hexafluoropropylene by oxidizing hexafluoropropylene to form hexafluoropropylene oxide. The hexafluoropropylene oxide is the polymerized, for example, in the presence of activated charcoal or certain inorganic fluorides such as cesium fluoride to yield $CF_3CF_2CF_2O[CF(CF_3)CF_2O]_dCF(CF_3)COF$, in the presence of carbonyl fluoride to yield $CF_3O[CF(CF_3)CF_2)]_dCF(CF_3)COF$, in the presence of perfluoroacid fluorides such as $R_fCOF$ to yield $R_fCF_2O[CF(CF_3)CF_2O]_dCF(CF_2)COF$, in the presence of perfluoroketones to yield $(R_f)_2CFO[CF(CF_3)CF_2O]_dCF(CF_3)COF$, in the presence of perfluorocyclic ketones to yield $R_f'CFO[CF(CF_3)CF_2O]_dCF(CF_3)COF$ wherein $R_f'$ is a 3 to 8 carbon perfluoroalkylene, or in the presence of alkali metal salts of perfluoro-tertiary-alcohols, e.g., $(F_f)_3COCs$, to yield $(F_f)_3CO[CF(CF_3)CF_2O]_dCF(CF_3)COF$.

The thus-formed acid fluorides are then reduced to the corresponding alcohols, $R_fO[CF(CF_3)CF_2O]_dCF(CF_3)CH_2OH$, for example with sodium borohydride or with hydrogen and catalysts. These alcohols are then converted to the corresponding acrylic or methacrylic acid esters by, for example, direct esterification of the alcohol with acrylic or methacrylic acid in the presence of an acid such as sulfuric acid, reaction of the alcohol with acrylic or methacrylic acid chlorides, in the presence of tertiary amines, or by transesterification of the alcohol with lower alkyl esters, for example methyl or ethyl acrylate or methacrylate, in the presence of mineral acids such as sulfuric acid or tetraalkyl titanates such as tetraisopropyl titanate. Such procedures for preparing these acrylate- or methacrylate-functional poly(perfluoropropyleneoxy) oligomers are described in U.S. Pat. No. 3,544,537 (Brace) which is incorporated by reference herein for that purpose.

The coating of the invention is preferably prepared by coating at least one surface of the substrate with a coating solution containing, for example, 0.5 to 30 weight percent of the poly(perfluoropropyleneoxy) oligomer, $R_fO[CF(CF_3)CF_2O]_dCF(CF_3)CH_2OCOCR=CH_2$, in perfluorooctane, drying the coating to remove the solvent, and in situ polymerizing the oligomer.

Suitable substrates to which the coating can be applied include, for example, woven and nonwoven fabrics, paper, glass, ceramics, steel, aluminum, polymeric materials such as polyester, polyurethane, epoxy resins phenol-formaldehyde resins, polyvinyl chloride, and the like. For those applications in which the coating is to be a release liner for a pressure-sensitive adhesive tape or sheet material, it is desirable that the substrate be a flexible paper, fabric, or polymeric film.

The coating solution can be applied to the substrate using conventional coating techniques such as brushing, dipping, wire or knife coating, spraying, curtain coating, or gravure coating. The thickness of the coating can be conveniently controller by appropriate selection of the concentration of the poly(perfluoropropyleneoxy) oligomer in the solvent from which it is coated. Suitable solvents include fluorocarbon and chlorofluorocarbon solvents such as perfluorooctane 1,1,2-trichloro-2,2,1-trifluoroethane, perfluorodecane, perfluorotributylamine, and perfluoro(2-butyl tetrahydrofuran).

The concentration of the poly(perfluoropropyleneoxy) oligomer in the solvent is preferably in the range of from about 0.01 to 30 weight percent, more preferably about 0.01 to 10 weight percent, most preferably 0.05 to 1 weight percent.

After the coating has been applied, the solvent is removed by air drying or, preferably, the solvent is removed in a chamber in which the solvent can be recovered. If desired, heat can be applied to accelerate the drying.

The thickness of the dried coating can vary widely, for example, from about 5 nm to 500 nm or more, although the coating thickness is generally preferably less than 500 nm, more preferably less than about 100 nm.

The dried coating is then polymerized in situ on the substrate surface by application of an appropriate source of energy such as heat, electromagnetic energy, or actinic radiation to form the release coating. Preferably, polymerization is achieved by exposing the coating to actinic radiation such as, for example ultraviolet radiation. Polymerization of the coating can generally be achieved by exposure for a period of about 1 second to 30 minutes depending on the thickness of the coating and the intensity of the radiation. Any source of ultraviolet radiation which emits radiation at wavelengths below about 4000 A may be used. Conventional low, medium, and high pressure mercury vapor lamps are useful sources of ultraviolet radiation. Examples of such lamps include the GE$^{TM}$ H3T arc lamp, available from General Electric Co., and the Hanovia 450W arc lamp, available from ACE Glass Company. Radiation sources rich in ultraviolet radiation such as fluorescent lamps and "black" lights are also useful. Particularly preferred sources of ultraviolet radiation are continuous processors which are capable of continuously exposing the coated substrates at rates up to about 300 m/min or more. Such processors include the PPG Processor, Model QC 1201AN1R, available from PPG Industries, Inc., In which the radiation is provided by medium pressure mercury lamps, each lamp emitting about 40 to 120 watts/cm. To increase the rate at which polymerization occurs, the coating can be irradiated at elevated temperatures, e.g., from about 25 to 100° C.

To further increase the rate of polymerization, a source of free radicals can be added to the coating solution. When polymerization is effected by heat, the source of free radicals can be a thermally activated polymerization initiator such as azo compounds, e.g., azobis(isobutyronitrile), or peroxides, e.g., benzoyl peroxide and cyclohexanone peroxide. The amount of thermally activated polymerization initiator used is generally about 0.01 to 5 weight percent based on the amount of poly(perfluoroalkyleneoxy) oligomer.

When the activating energy is actinic radiation, the source of free radicals can be a photoinitiator. Examples of useful photoinitiators include benzophenone, benzophenone/amine combinations, benzoin, benzoin ethers, and their derivatives such as benzildimethylketal. The amount of photoinitiator used is generally about 0.001 to 5 weight percent based on the poly(perfluoropropyleneoxy) oligomer.

When the substrate on which the coating is to be applied has low surface energy such as polyolefin sheet or film, it may be desirable to apply a primer, or adhesion promoting layer, to the substrate prior to application of the poly(perfluoropropyleneoxy) oligomer solution. Useful primers include, for example, polyvinylidene chloride, trialkoxy-functional siloxanes such as vinyltriethoxysilane and, γ-aminopropyltrimethoxysilane, and the polyacrylates which are disclosed in U.S. Pat. No. 4,567,073, which is incorporated by reference herein for that purpose. When the primer is a polyacrylate, the primer is preferably partially polymerized on the substrate prior to application of the poly(perfluoropropyleneoxy) oligomer solution.

The following nonlimiting examples are provided to further illustrate the invention. In these examples, all parts and percentages are by weight unless otherwise specified. The following test methods are used to evaluate the coated substrate of the invention:

RELEASE ADHESION TEST I

Onto a sheet of release coated substrate, an adhesive solution is coated such that the adhesive thickness is about 25 to 100 micrometers after drying to remove the solvent. To this adhesive surface is laminated a 25 to 50 micrometer thick sheet of polyethylene terephthalate film from which are cut 2.5 cm wide, 15 cm long strips. The force required to peel the polyethylene terephthalate film together with the adhesive from the release coated substrate at an angle of 180° and a peel rate of 2.3 m/min, is measured.

RELEASE ADHESION TEST II

A 2.5 cm wide, 15 cm long strip of pressure-sensitive adhesive tape is laminated to a release coated substrate. The force required to peel the tape from the substrate at an angle of 180° and a peel rate of 2.3 m/min, is measured.

READHESION TEST

The polyethylene terephthalate film strip bearing the adhesive coating as removed from the release coated substrate in Release Peel Adhesion Test I or the pressure-sensitive adhesive tape removed from the release coated substrate in Release Peel Adhesion Test II is applied to a clear glass plate. The film strip or tape is peeled from the glass plate at an angle of 180° and a peel rate of 2.3 m/min and the force required to effect the peel is measured.

CONTROL ADHESION TEST

For purposes of comparison of the readhesion values of the polyethylene terephthalate film strip bearing the adhesive coating, a similar polyethylene terephthalate film is coated with adhesive solution and the coated film is dried to yield an adhesive thickness of about 25 to 100 micrometers in thickness. The thus-prepared tape is adhered to a clean glass plate and then removed at an angle of 180° and a peel rate of 2.3 m/min and the force required to effect the peel is measured.

For purposes of comparison of the readhesion values of the pressure-sensitive adhesive tape, a strip of the tape is applied to a clean glass plate, without first being in contact with the release coated substrate and removed at an angle of 180° and a rate of 2.3 m/min.

EXAMPLE 1

A poly(perfluoropropyleneoxy) oligomer having the formula

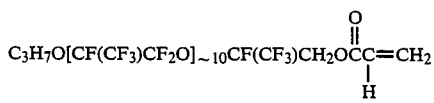

$$C_3H_7O[CF(CF_3)CF_2O]_{\sim 10}CF(CF_3)CH_2O\overset{O}{\underset{H}{\overset{\|}{C}}}C=CH_2$$

was prepared by reducing poly(perfluoropropyleneoxy) carboxylic acid having a number average molecular weight of about 2000 (available from E. I. du Pont de Nemours & Co. as Krytox ™ 157 FS) to poly(perfluoropropyleneoxy) carbinol and then esterifying the carbinol with acryloyl chloride. A one percent solution of this oligomer in Freon ™ 113 was coated onto 0.05 mm thick biaxially oriented polyethylene terephthalate film using a #3 RDS wire-wound coating rod and the solvent was allowed to evaporate. The dried coating had a calculated thickness of about 70 nm. The coated film was exposed to ultraviolet radiation using two medium pressure mercury lamps at 120 w/cm n a PPG ™ processor at a rate of 30 cm/sec in an inert atmosphere to polymerize the oligomer in situ and provide the film with a release coating.

This release coated film was evaluated for release peel immediately after adhesion (initial) and after aging the laminate for three days at 70° C. using a 2.54 cm wide MacuTape ™ P-3 poly(dimethylsiloxane) tape, an aggressive pressure-sensitive adhesive tape, available from MacDermid, Inc. The readhesion of the tape of glass was tested. Control adhesion of the tape was also tested. The results are set forth in Table I.

TABLE 1

|  | Initial | Aged |
|---|---|---|
| Release adhesion (N/dm) | 0.5 | 1.2 |
| Readhesion (N/dm) | 43 | 42 |
| Control adhesion (N/dm):44 | | |

As can be seen from the data in Table I, the polymerized poly(perfluoropropyleneoxy) acrylate release coating provided excellent release properties for the aggressive poly(dimethylsiloxane) pressure-sensitive adhesive tape without significantly reducing the holding power, i.e. readhesion, of the tape both initially and after aging.

EXAMPLE 2

A polyethylene terephthalate film was coated with a solution of only(perfluoropropyleneoxy) acrylate as in Example 1 except that a 50 micrometer thick primer layer of hydantoin hexacrylate was coated onto the polyethylene terephthalate film, dried, and partially cured using ultraviolet radiation, as described in U.S. Pat. No. 4,323,591 (Wendling), followed by application of the poly(perfluoropropyleneoxy) acrylate solution. The solvent was allowed to evaporate. The dried release coating was then exposed to ultraviolet radiation to polymerize the oligomer in situ as in Example 1 except that the dosage was 80 w/cm. The release properties of the release coated film were tested as in Example 1. The pressure-sensitive adhesive tape was also tested for readhesion properties as well as for control adhesion. The results are set forth in Table 2.

TABLE 2

|  | Initial | Aged |
|---|---|---|
| Release adhesion (N/dm) | 1.5 | 1.6 |
| Readhesion (N/dm) | 43 | 44 |
| Control adhesion (N/dm):44 | | |

As can be seen from the data in Table 2, excellent release and readhesion values are obtained at lower dosages of radiation than in Example 1 when the polyethylene terephthalate film substrate is primed with the hydantoin hexacrylate.

EXAMPLE 3

Polyethylene terephthalate film was coated with a one percent solution of poly(perfluoropropyleneoxy) acrylate oligomer in Freon ™ 113 as in Example 1. The solvent was allowed to evaporate and the dried coating was polymerized in situ as in Example 1 to provide the film with a release coating having a calculated thickness of about 70 nm.

A solution containing 33% GE 6574 TM adhesive, a silicone pressure-sensitive adhesive containing both methyl and phenyl siloxane units, available from General Electric Co., and 1.7% Cadox TM TS-50, a peroxide catalyst, available from Noury Chemical Corp., in xylene and toluene was coated onto the release coated side of the film. The solvent was evaporated at 70° C. and the resultant adhesive layer was cured for 5 minutes at 150° C. to produce a transfer adhesive layer about 50 micrometers thick. A second 0.05 mm thick polyethylene terephthalate film was laminated onto the adhesive using a smooth rubber roller. The release coating was tested for release properties both initially and after aging at 70° C. for three days and the adhesive, now adhered to the second polyethylene terephthalate film, was tested for readhesion properties. The results are set forth in Table 3.

TABLE 3

|  | Initial | Aged |
| --- | --- | --- |
| Release adhesion (N/dm) | 0.4 | 0.7 |
| Readhesion (N/dm) | 102 | 108 |

EXAMPLES 4 and 5

Polyethylene terephthalate film was coated with 1% and 0.5% poly(perfluoropropyleneoxy) acrylate oligomer solutions as in Example 1. The solvent was allowed to evaporate and the dried coating was polymerized in situ as in Example 1 to provide the film with a release coating having a calculated thickness of about 70 nm (Example 4) and 35 nm (Example 5).

A solution containing 33% DC Q2-7406 TM adhesive, a silicone pressure-sensitive adhesive containing methyl siloxane units, available from Dow Corning Co., and 1% Cadox TM TS-50, a peroxide catalyst, available from Noury Chemical Corp., in xylene and toluene was coated onto the release coated side of each film. The solvent was evaporated at 70° C. and the resultant adhesive layers were cured for 5 minutes at 150° C. to produce transfer adhesive layers about 50 micrometers thick. A second 0.05mm thick polyethylene terephthalate film was laminated onto each adhesive layer using a smooth rubber roller. The release coatings were tested for release properties both initially and after aging at 70° C. for three days and the adhesive, now adhered to the second polyethylene terephthalate film, was treated for readhesion properties. Control adhesion of the tape was also tested. The results are set forth in Table 4.

TABLE 4

|  | Example 4 | | Example 5 | |
| --- | --- | --- | --- | --- |
|  | Initial | Aged | Initial | Aged |
| Release adhesion (N/dm) | 12.7 | 7.6 | 3.5 | 2.9 |
| Readhesion (N/dm) | 66 | 67 | 72 | 71 |
| Control adhesion (N/dm):73 | | | | |

EXAMPLES 6 and 7

Polyethylene terephthalate film was coated with 1% and 0.5% poly(perfluoropropyleneoxy) acrylate oligomer solutions as in Example 1. The solvent was allowed to evaporate and the dried coatings were polymerized in situ as in Example 1 to provide the films with release coatings having a calculated thicknesses of about 70 nm (Example 6) and 35 nm (Example 7).

A solution containing 15% of a 95.5:4.5 isooctyl acrylate:acrylic acid copolymer acrylic-type adhesive, as described in Example 5 of U.s. Pat. No. RE 24,906 which is incorporated herein by reference for that purpose, in methyl ethyl ketone was coated onto the release coated side of each film. The solvent was evaporated at 70° C. and the resultant transfer adhesive layers were about 25 microns thick. A second 0.05 mm thick polyethylene terephthalate film was laminated onto each adhesive layer using a smooth rubber roller. The release coatings were tested for release properties both initially and after aging at 70° C. for three days and the adhesive, now adhered to the second polyethylene terephthalate film, was tested for readhesion properties. Control adhesion of the tape was also tested. The results are set forth in Table 5.

TABLE 5

|  | Example 6 | | Example 7 | |
| --- | --- | --- | --- | --- |
|  | Initial | Aged | Initial | Aged |
| Release adhesion (N/dm) | 0.97 | 1.0 | 1.0 | 0.8 |
| Readhesion (N/dm) | 55 | 61 | 50 | 53 |
| Control adhesion (N/dm):66 | | | | |

EXAMPLES 8 and 9

Poly(perfluoropropyleneoxy) acrylate oligomer solutions prepared as in Example 1, except that the concentration of oligomer in the solutions was 1 percent in Example 8 and 0.8 percent in Example 9, were coated onto polyethylene terephthalate film, dried, and polymerized in situ as in Example 1 to yield release coatings having coating thicknesses of 70 nm (Example 8) and 55 nm (Example 9).

Onto each release coating an 18 percent solution in Freon TM 113 of Dow Corning TM 355 medical grade adhesive, a dimethyl silicone pressure-sensitive adhesive, available from Dow Corning Co., was coated and dried to provide an adhesive layer about 40 micrometer thick on each release coating. A second 0.05 mm thick polyethylene terephthalate film was laminated onto each adhesive using a smooth rubber roller. The release properties of the release coatings and readhesion of the resulting adhesive coated second polyethylene terephthalate films were tested after aging for 24 hours at 70° C. (1 day) and after aging 14 days at 70° C. The results are set forth in Table 6.

TABLE 6

|  | Example 8 | | Example 9 | |
| --- | --- | --- | --- | --- |
|  | Aged 1 Day | Aged 14 Days | Aged 1 Day | Aged 14 Days |
| Release adhesion (N/dm) | 1.4 | 1.0 | 2.0 | 1.5 |
| Readhesion (N/dm) | 57 | 57 | 61 | 59 |

As can be seen from the data in Table 4, the poly(perfluoropropyleneoxy) acrylate release coatings at thicknesses of 55 nm and 70 nm provide excellent release and readhesion properties for the uncured dimethyl silicone pressure-sensitive adhesive.

EXAMPLE 10

Poly(perfluoropropyleneoxy) carbinol, prepared as in Example 1, was fractionated using a CVC molecular still into 5 volatile fractions and a residue with the number average molecular weights of the poly(perfluoroalkyleneoxy) segments, $[CF(CF_3)CF_2O]_n$ of the fractions ranging from about 1000 to 2700. The product of each fraction was then esterified with acryloyl chloride in the presence of triethylamine to yield poly(perfluoropropyleneoxy) acrylate. An unfractionated portion of the poly(perfluoropropyleneoxy) carbinol having a number average molecular weight of about 2100 was similarly esterified. One percent solutions in Freon TM 113 of each of the poly(perfluoropropyleneoxy) acrylate oligomers were coated onto biaxially oriented 0.05 mm thick polyethylene terephthalate film, dried, and polymerized as in Example 1 to form release coatings on the film.

A 2.54 cm wide poly(dimethylsiloxane) pressure-sensitive adhesive tape, MacuTape TM P-3, available from MacDermid, Inc., was adhered to each release coating using a smooth rubber roller. Release and readhesion properties of the release coatings and the adhesive were evaluated initially and after aging for 3 days at 70° C. The results are set forth in Table 7. The control adhesion of this pressure-sensitive adhesive tape was also evaluated and was found to be 39 N/dm.

TABLE 7

| Fraction | Segment Mn | Initial Release | Initial Re-adhesion | Aged Release | Aged Re-Readhesion |
|---|---|---|---|---|---|
| 1 | 1020 | 3.3 N/dm | 34 N/dm | 19 N/dm | 23 N/dm |
| 2 | 1400 | 1.9 N/dm | 34 N/dm | 6.6 N/dm | 27 N/dm |
| 3 | 1660 | 0.7 N/dm | 33 N/dm | 0.8 N/dm | 31 N/dm |
| 4 | 2120 | 0.5 N/dm | 33 N/dm | 0.5 N/dm | 31 N/dm |
| 5 | 2670 | 0.4 N/dm | 33 N/dm | 0.5 N/dm | 31 N/dm |
| 6 | 2700 | 0.7 N/dm | 34 N/dm | 0.7 N/dm | 32 N/dm |
| unfractionated | 1730 | 1.0 N/dm | 35 N/dm | 0.8 N/dm | 33 N/dm |

As can be seen from the data in Table 7, the acrylate oligomers prepared from the unfractionated material and the fractions having number average molecular weight of at least about 1600 provide excellent release and readhesion values both initially and after aging with the poly(dimethylsiloxane) pressure-sensitive adhesive. The release coating prepared from the fraction having a segment number average molecular weight of about 1000 has poor release properties for the poly(dimethylsiloxane) pressure-sensitive adhesive after aging.

The various modifications and alterations of this invention will be apparent to those skilled in the art without departing from the scope and spirit of this invention and this invention should not be restricted to that set forth herein for illustrative purposes.

What is claimed is:

1. A coated article comprising a substrate having a low surface energy coating thereon, said coating comprising an in situ polymerized monofunctional poly(perfluoropropyleneoxy) acrylate or methacrylate oligomer, said oligomer having a poly(perfluoropropyleneoxy) segment, $[CF(CF_3)CF_2O]_d$, having a number average molecular weight of about 1200 to 1,000 wherein d is a number having an average value of from 7-60.

2. The coated article of claim 1 wherein said monofunctional poly(perfluoropropyleneoxy) acrylate or methacrylate oligomer can be represented by the formula

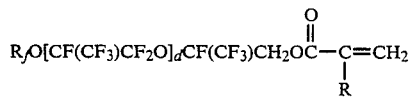

wherein $R_f$ is a straight, branched, or cyclic perfluoroalkyl group having 1 to 5 carbon atoms, d is a number having an average value of from about 7–60, and R is hydrogen or methyl.

3. The coated article of claim 2 wherein said poly(perfluoropropyleneoxy) segment $[CF(CF_3)CF_2O]_d$ has a number average molecular weight of at least about 1600.

4. The coated article of claim 1 further comprising a primer layer between said substrate and said polymerized oligomer.

5. The coated article of claim 4 wherein said primer layer comprises polymerized hydantion hexacrylate.

6. The coated article of claim 1 wherein said substrate comprises a flexible fabric, paper, or polymeric film, said substrate has a first surface coated with said polymerized oligomer, and a second surface opposite said first surface having a pressure-sensitive adhesive bonded thereto.

7. The coated article of claim 6 wherein said adhesive comprises a silicone adhesive.

8. The coated article of claim 6 wherein said adhesive comprises a poly(dimethylsiloxane).

9. The coated article of claim 1 further comprising a pressure-sensitive adhesive coated over said polymerized oligomer.

10. The coated article of claim 9 wherein said adhesive comprises a silicone adhesive.

11. The coated article of claim 9 wherein said adhesive comprises poly(dimethylsiloxane).

12. A pressure-sensitive adhesive tape comprising a flexible substrate having a low surface energy coating on one surface thereof, said coating comprising an in situ polymerized monofunctional poly(perfluoropropyleneoxy) acrylate or methacrylate oligomer, the poly(perfluoropropyleneoxy) segments of which have a number average molecular weight of about 1200 to 10,000, and said substrate having a pressure-sensitive adhesive on the second surface of said substrate opposite said low surface energy coated surface.

13. The pressure-sensitive adhesive tape of claim 12 wherein said adhesive comprises a silicone adhesive.

14. A pressure-sensitive transfer tape comprising a flexible substrate having a low surface energy coating on at least one surface thereof, said coating comprising an in situ polymerized monofunctional poly(perfluoropropyleneoxy) acrylate or methacrylate oligomer, the poly(perfluoropropyleneoxy) segments of which have a number average molecular weight of about 1200 to 10,000, and a pressure-sensitive adhesive on at least one coated surface.

15. The transfer tape of claim 14 wherein both surfaces of said substrate have said coating thereon and one coated surface carries a pressure-sensitive adhesive.

16. The transfer tape of claim 14 wherein said pressure-sensitive adhesive comprises a silicone adhesive.

* * * * *

UNITED STATES PATENT AND TRADEMARK OFFICE
CERTIFICATE OF CORRECTION

PATENT NO. : 4,873,140
DATED : Oct. 10, 1989
INVENTOR(S) : McIntyre

It is certified that error appears in the above-identified patent and that said Letters Patent is hereby corrected as shown below:

Col. 1, line 1, title should read --ARTICLES HAVING LOW ADHESION COATINGS THEREON--

Col. 2, lines 36 & 37, "pefluoropolyether" should read --perfluoropolyether--

Col. 4, line 6, "$C_3F_6$)-  should read-- --$C_3F_6O$--

Col. 5, line 9, "$R_{fCF2}O$" should read --$R_fCF_2O$--

Col. 5, line 56, "controller" should read --controlled--

Col. 8, line 7, "120 w/cm n a" should read --120 w/cm in a--

Col. 8, line 35, "only(perfluoropropyleneoxy)" should read --poly(perfluoropropyleneoxy)--

Col. 10, line 3, "U.s. Pat." should read --U.S. Pat.--

Signed and Sealed this

Twelfth Day of February, 1991

Attest:

HARRY F. MANBECK, JR.

Attesting Officer

Commissioner of Patents and Trademarks